United States Patent
Geib et al.

(10) Patent No.: US 9,344,346 B2
(45) Date of Patent: May 17, 2016

(54) LOOPING MPLS PATHS AT FORWARDING LEVEL FOR CONNECTIONLESS MPLS NETWORKS

(75) Inventors: Ruediger Geib, Darmstadt (DE); Maic Groffmann, Wiesbaden (DE); Martin Horneffer, Muenster (DE)

(73) Assignee: DEUTSCHE TELEKOM AG, Bonn (DE)

( * ) Notice: Subject to any disclaimer, the term of this patent is extended or adjusted under 35 U.S.C. 154(b) by 228 days.

(21) Appl. No.: 13/985,896

(22) PCT Filed: Feb. 19, 2011

(86) PCT No.: PCT/DE2011/000162
§ 371 (c)(1),
(2), (4) Date: Sep. 10, 2013

(87) PCT Pub. No.: WO2012/110011
PCT Pub. Date: Aug. 23, 2012

(65) Prior Publication Data
US 2013/0343204 A1    Dec. 26, 2013

(51) Int. Cl.
*H04L 12/28* (2006.01)
*H04L 12/26* (2006.01)
*H04L 12/24* (2006.01)
*H04L 12/723* (2013.01)
*H04L 12/721* (2013.01)

(52) U.S. Cl.
CPC ........ *H04L 43/0811* (2013.01); *H04L 12/2697* (2013.01); *H04L 41/08* (2013.01); *H04L 43/50* (2013.01); *H04L 45/507* (2013.01); *H04L 45/68* (2013.01)

(58) Field of Classification Search
None
See application file for complete search history.

(56) References Cited

U.S. PATENT DOCUMENTS

| | | | |
|---|---|---|---|
| 7,940,695 B1 | 5/2011 | Bahadur et al. | |
| 2002/0037010 A1 | 3/2002 | Yamauchi | |
| 2005/0013297 A1* | 1/2005 | Eriksson | 370/392 |
| 2005/0220096 A1* | 10/2005 | Friskney et al. | 370/389 |
| 2006/0013145 A1* | 1/2006 | Boodaghians | 370/249 |
| 2006/0198321 A1 | 9/2006 | Nadeau et al. | |
| 2007/0121615 A1* | 5/2007 | Weill et al. | 370/389 |
| 2008/0049621 A1* | 2/2008 | McGuire | H04L 12/24 370/236.2 |
| 2008/0084890 A1* | 4/2008 | Kompella | H04L 45/02 370/400 |
| 2009/0003350 A1* | 1/2009 | Guichard | H04L 45/02 370/392 |
| 2009/0154373 A1* | 6/2009 | Ye et al. | 370/253 |

(Continued)

FOREIGN PATENT DOCUMENTS

| | | |
|---|---|---|
| JP | 2002111725 A | 4/2002 |
| JP | 2005522146 A | 7/2005 |

(Continued)

*Primary Examiner* — Ian N Moore
*Assistant Examiner* — Phong La
(74) *Attorney, Agent, or Firm* — Leydig, Voit & Mayer, Ltd.

(57) ABSTRACT

A method for transferring Multiprotocol Label Switching (MPLS) packets in connectionless networks, the MPLS packets passing a number of inner MPLS switching nodes on a transmission path between a sender and a destination as well as at least two MPLS edge routers, each MPLS edge router being a transition between a core network and a connection network, include: producing an address stack or label stack for an MPLS packet to be sent. The address stack or label stack includes address information on the inner switching nodes to be passed on its transmission path and address information for the at least two edge routers to be passed on its transmission path.

24 Claims, 4 Drawing Sheets

(56) References Cited

U.S. PATENT DOCUMENTS

2011/0040885 A1* 2/2011 Jounay .................. H04L 45/00
                                                    709/228
2013/0343397 A1   12/2013 Lee et al.

FOREIGN PATENT DOCUMENTS

| JP | 2008527772 A | 7/2008 |
| WO | WO 2010126724 A1 | 11/2010 |
| WO | WO 2011002629 A1 | 1/2011 |

* cited by examiner

LOOPING MPLS PATHS AT FORWARDING LEVEL FOR CONNECTIONLESS MPLS NETWORKS

CROSS-REFERENCE TO RELATED APPLICATIONS

This application is a U.S. National Phase application under 35 U.S.C. §371 of International Application No. PCT/DE2011/000162, filed on Feb. 19, 2011. The International Application was published in German on Aug. 23, 2012 as WO 2012/110011 A2 under PCT Article 21(2).

FIELD

The present invention relates to the looping of MPLS paths at forwarding level for connectionlessly routed MPLS data networks. The present invention relates, in particular, to the switching method in data networks by means of multiprotocol label switching (MPLS), which allows the transmission of data packets in a connectionless network on a path constructed beforehand by means of what are known as MPLS control packets. This switching method is primarily used in large transport networks, such as, for example, the internet, in which speech and data services based on internet protocols (IP) can be transmitted.

BACKGROUND

During data transmission in a connectionless network, data can be sent in the form of data packets from a terminal to a destination or a receiver, the network or switching nodes (generally "core routers" or edge routers) located on the transmission path receiving, together with the data packet, information as to how the data are to be forwarded. If, on the other hand, before data are sent by a terminal, a path through the network to the receiver first has to be set up or signalled, this is what is known as a connection-oriented data transmission. In this case, the network nodes (generally "switches") are provided beforehand by measuring packets with the necessary connection information in order to then correctly forward the sent data.

The transition between two networks or sub-networks, such as, for example, the transition between a core network and a connection network, is generally called an edge in networks. While what are known as inner routers (IR routers) or core routers are used as switching nodes in the core network, what are known as edge routers, which take on the switching function between the core network and the connection region and are therefore the broadband access of a network connection on what is known as the last mile, are used at net transitions. In an autonomous system of a network integration, at least one edge router is set up, for example, as what is known as an exterior gateway, which connects the autonomous system to another autonomous system. Such edge routers are connected to the switching nodes (core routers) in the core network and transfer the data packets between the core network and the connection network.

In MPLS routing, what are known as tunnels or MPLS paths are realised in the network to transmit data packets. For this purpose, the destination of a packet is determined with the aid of its received destination address information in order to send the packet on the corresponding MPLS path. This may be an IP-address, MPLS information, Ethernet information or other destination information. An MPLS (network) edge router or switching node determines, with the aid of this address information, an address stack or label stack for the relevant data packet, which it adds to the data packet. The MPLS path, which the packet takes via the edge router(s) on the path to the destination, is thus determined.

On the path to the destination, the upper label of the address stack or label stack is exchanged at each router of the valid transport level. At the destination edge router or at the router or switching node located before this, the upper label or the upper address of the label stack or the address stack is then removed. The destination edge router forwards the data packet as an IP packet or evaluates a "virtual connection label" and then determines the next step. In the process, the destination edge router removes the "virtual connection label" and sends the packet to a local interface, which is identified by the "virtual connection label". Alternatively, the destination edge router replaces the "virtual connection label" and supplements a further transport label on the data packet.

In order to send back an IP measuring packet to a sender or to loop it, an IP-echo request/reply function has to be used, also known as a "ping" (standards: RFC 792 for IPv4 and RFC 2463 for IPv6). A comparable function was also standardised for MPLS, for example an MPLS- or IP-echo request/reply function (MPLS ping, standard RFC 4379). Measurements can be carried out at each edge router with measuring apparatuses of their own between two measuring points, or measuring loops as line pieces between physical ports of an edge router or as a continuity check as in IEEE 802.1 ag or Y. 1731 being a further solution possibility. Conventional solutions, for example according to the standard RFC 5085, loop data packets back at the level of a virtual connection. However, the conventional standards without exception require special configurations or software at the two ends of a measuring connection and therefore special configurations or software at at least two edge routers. In some of the conventional solutions, the forwarding level is left and the measuring packet is processed by the software of the edge router, which may, however, falsify the measurement. Other solutions assume a connection-oriented path guidance, in which an MPLS path has to be present in the two directions at each MPLS router.

SUMMARY

In an embodiment, the present invention provides a method for transferring Multiprotocol Label Switching (MPLS) packets in connectionless networks. The MPLS packets pass a number of inner MPLS switching nodes on a transmission path between a sender and a destination as well as at least two MPLS edge routers. Each MPLS edge router being a transition between a core network and a connection network. The method includes: producing an address stack or label stack for an MPLS packet to be sent. The address stack or label stack includes address information on the inner switching nodes to be passed on its transmission path and address information for the at least two edge routers to be passed on its transmission path.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
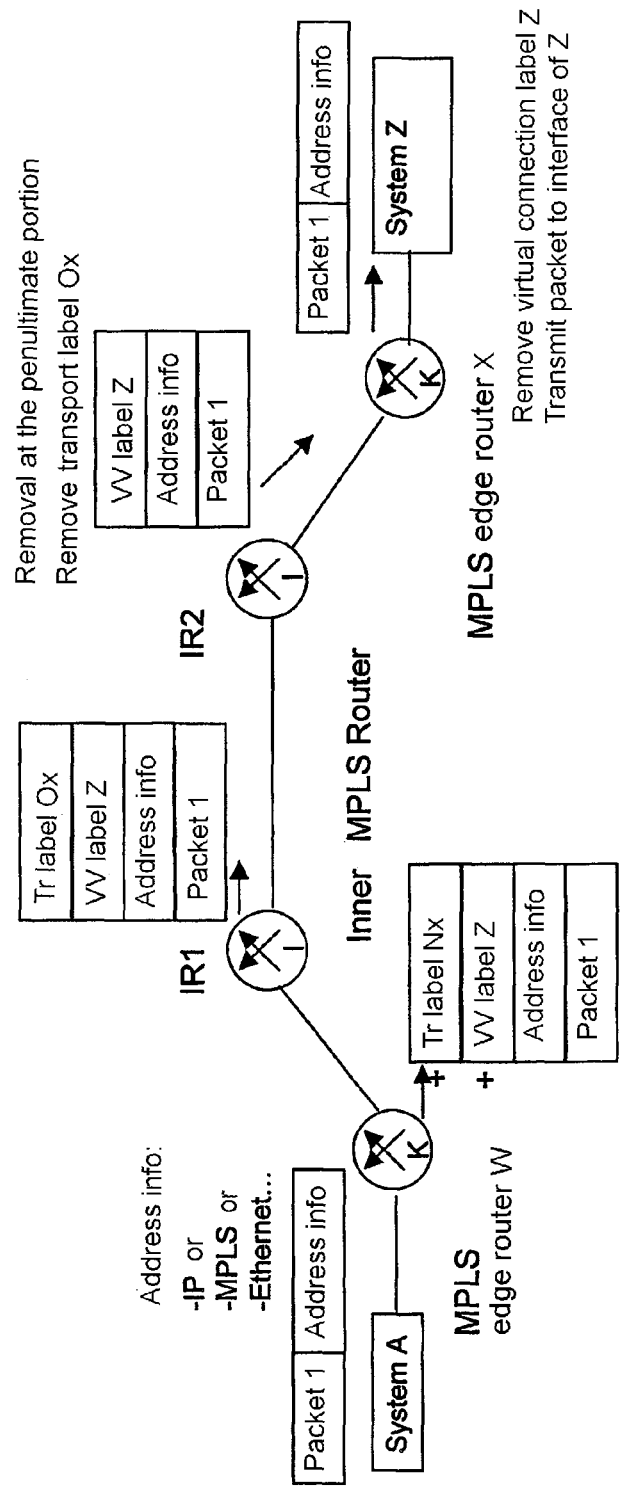
FIG. 1 shows a schematic representation of an MPLS data packet transport in a connectionlessly routed MPLS data network according to the prior art.

Embodiments of the present invention eliminate the aforementioned drawbacks of conventional solutions.

Embodiments of the present invention utilise existing, but not previously utilised, functions of an MPLS label exchange matrix in MPLS edge routers. Particular features of embodiments of the present invention include:

So-called measuring packets, which are provided with MPLS labels, are sent to an edge router.

The edge router loops the data packets on an MPLS path to the destination, in that the edge router exchanges the upper label or the upper address of the label stack or the address stack of the data packet, instead of supplementing it as previously in the prior art. Depending on the mode of operation of an MPLS core network, the edge router can firstly remove the upper label and only then exchanges the upper address of the label stack or address stack from the data packet.

The label stack of a measuring packet is furthermore not determined by a routing protocol, but by an external measuring packet control system.

The combination of these mechanisms according to embodiments of the invention makes it possible to loop MPLS packets via a series MPLS edge routers predetermined by the control system for measuring packets to a destination edge router. Advantageously, apart from standard forwarding, no particular functionality is necessary for this purpose in MPLS edge routers, such as, for example, MPLS- or IP-echo request/reply functions.

The term edge router and MPLS edge router will be used below with an identical meaning. With embodiments of the present invention, any desired number of edge routers can be included in the transmission path of a measuring packet, of what is known as a measuring loop. Furthermore, no or only slight configurations to existing edge routers are required for this purpose. In addition, the forwarding level does not have to be left during a measurement. Furthermore, existing software for edge routers can be used to apply embodiments of the invention.

According to a preferred embodiment, the uppermost label or the uppermost address of the label stack or address stack of an MPLS data packet is removed at the penultimate MPLS switching node or at the destination edge router. Either an IPv4 packet is exposed therebelow or a "virtual connection label" or VC-label (in RFC 4046, VC label). An IPv4 packet is routed in the edge router. A VC-label is removed by the edge router and the packet is sent to the physical or logical interface, which identifies the VC-label. In what is known as a "multi-segment pseudo wire", the VC-label can also be exchanged and be supplemented by a further transport label. Additional labels are also possible, such as, for example, the entropy label, which can appear in a label stack, but which is not significant for the present invention.

A measuring packet can be constructed with the aid of a measuring packet control system in such a way that the packet received at a destination edge router is forwarded to another destination edge router, it being possible for the latter to also be the original or sender edge router or any other edge router. The measuring packet control system can determine how many and which labels are stacked in one of the measuring packets. In this case, the label stacks determined by the measuring packet control system may also correspond to the label stacks of the known routing and MPLS VPN or pseudo wire protocols. However, label stacks such as cannot be produced by already known routing and MPLS VPN or pseudo wire protocols, are also possible. In a case such as this, any desired order that can be configured in a controlled manner of edge routers can be run through, without special routing protocols or functions going beyond LDP or RSVP TE having to be active.

The present invention will be described in more detail below with the aid of preferred embodiments with reference to the accompanying drawings.

FIG. 1 is a schematic representation of a conventional MPLS switching using the example of MPLS packet transport in a connectionlessly routed MPLS data network according to the prior art. In this case, the network comprises a sender system A, which sends a data packet 1 to a receiver system Z. On the way from the sending system A to the receiving system Z, the data packet 1 passes the MPLS edge router W, the two inner MPLS routers IR1 and IR2 and the MPLS edge router X.

In the example shown in FIG. 1 for a conventional system, a destination system having the address Z is to be reached by the sending system A, it being possible for Z to be the destination address information, an MPLS label an IPv4- or Ethernet address.

The sending system A sends a data packet 1 to be transmitted to the MPLS edge router W, which is directly connected to the sending system A. The data packet 1 comprises an address stack or a label stack, which contains at least a transport address or a service label S. The MPLS edge router W adds a transport label Mx and a virtual connection label Z to the label stack of the data packet 1 and forwards the data packet 1 to an inner MPLS router of the MPLS transmission path.

The inner MPLS router before the edge router X removes the transport label Nx from the label stack and sends the data packet 1 with the virtual connection label Z to the MPLS edge router X, which is connected to the receiving destination system Z. The MPLS edge router X removes the virtual connection label Z from the label stack and transmits the data packet 1 onto the interface of the destination system Z. In a conventional system, generally only packets from the connection network of an edge router can be sent to the connection network of another edge router. The protocols VCCV, RSVP-TE and multi-segment pseudo wire, which, however, all in turn require additional protocols and functions, are exceptions. The embodiments of the invention shown here require only MPLS paths, which are set up with the protocol LDP according to the prior art.

In an embodiment, the measuring packet (packet 1) runs through the switching nodes or edge routers W, X and Y in this order from the sending system A before the destination address Z is reached. The switching information required for this, as shown in FIG. 2, is in each case only stored locally on the edge routers W, X and Y.

The sending system A is directly linked to the edge router W, but has no so-called "routing" relationship with the MPLS edge router X. In the example shown, the sending system A is, however, to send MPLS packets provided with labels to the MPLS edge router X, which the edge router Y treats like MPLS packets and which the edge router W receives on other MPLS interfaces.

In order to run through the path edge routers W, X and Y as desired, the MPLS measuring packet control system now has to determine the following information for the composition of the label stack of the MPLS measuring packet (packet 1) in order to assemble therefrom a label stack for a measuring packet previously not existing according to conventional systems. This can take place in the following manner:
1. The destination address information of the destination system Z in the form of an IPv4 address or a label, with which a received packet is correctly guided by the edge router Y to the destination system Z. Alternatively, the logical or physical interface, to which the destination system is connected, can also be determined.
2. The arriving label My of the measuring packet, which is replaced by the edge router X with the label Ny and is sent on the MPLS path to the edge router D.
3. The arriving label Mx, which is replaced by the edge router W with the label Nx and is sent on the MPLS path to the edge router X.

Figure 2:
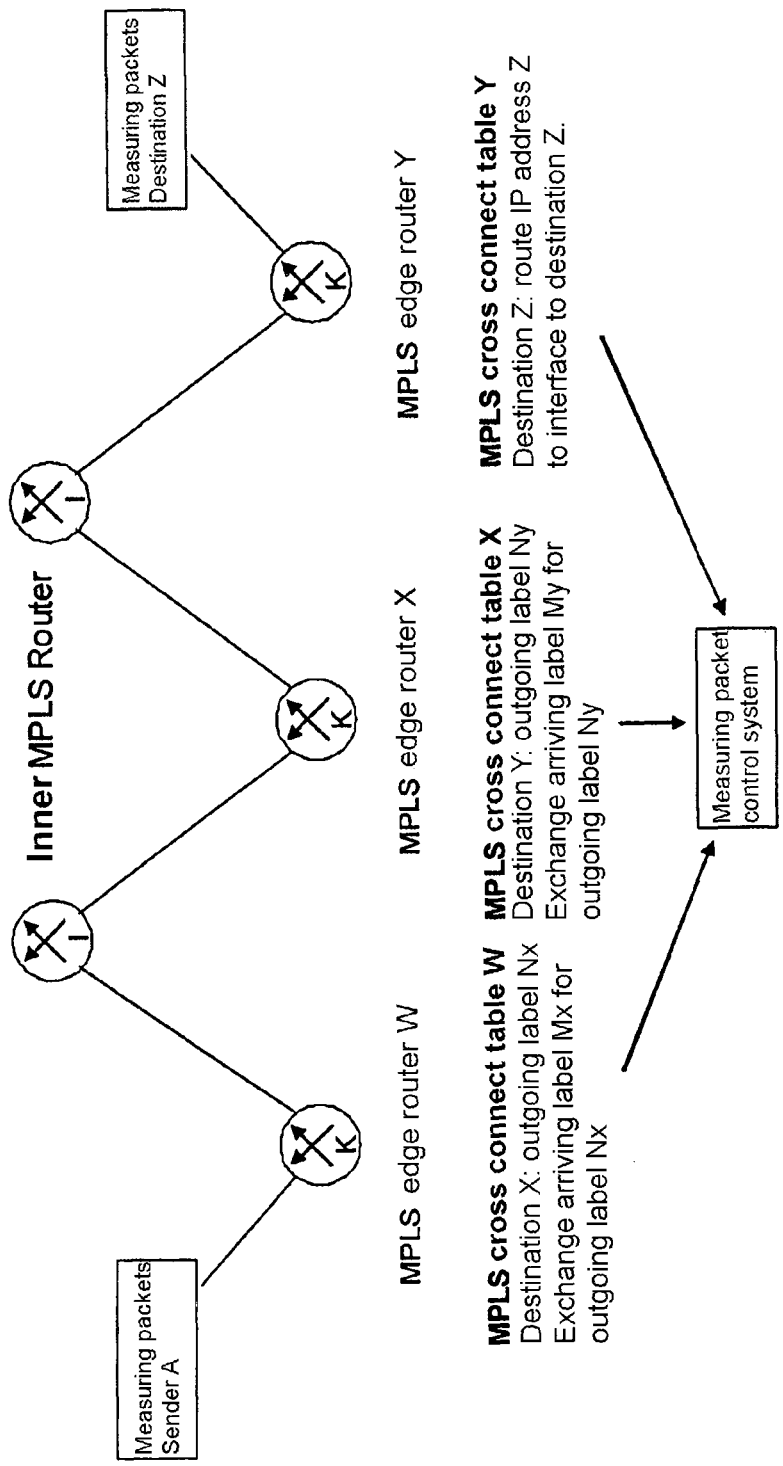
FIG. 2 shows a schematic representation of the read-in process of an MPLS measuring packet control system according to an embodiment of the present invention for preparing an MPLS data packet transport in a connectionlessly routed MPLS data network.
Figure 3:
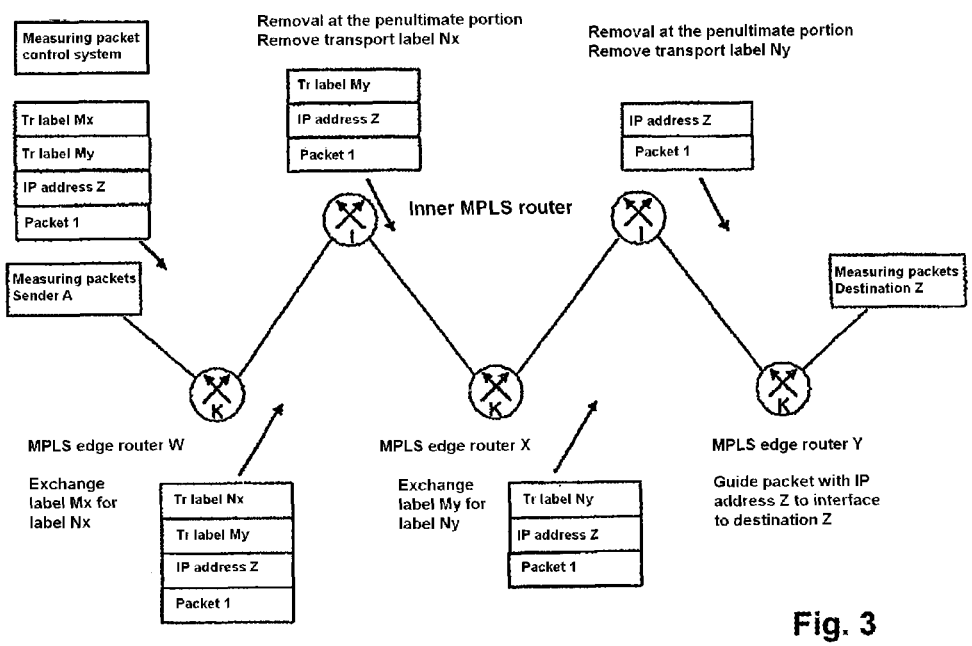
FIG. 3 shows a schematic representation of an MPLS data packet transport in a connectionlessly routed MPLS data network according to an embodiment of the present invention.

This manner of proceeding takes place in the example shown in FIG. 3, in that the MPLS packet control system reads out beforehand, as shown in FIG. 2, the label switching information present in the edge routers W, X and Y. There are various possibilities for this in conventional systems, for example via network management interfaces of the edge routers W, X and Y. The process of sending packets in accordance with embodiments of the invention is shown in FIG. 3 and explained below.

Connection-oriented protocols such as MPLS TP or Ethernet assume that both the forward and also the return path for packets between two switching nodes are always present at an edge router or router. In other words, recursive data line paths or what are known as loops have to be installed. As a result, a recursive data line path or a loop can be set up between two switching nodes. Embodiments of the present invention, however, moreover allows a looping in connectionlessly routed MPLS networks, in which a path back to an edge router W, which could not be utilised with conventional protocols and mechanisms, is present or can be set up at an edge router X.

Using the MPLS data transmission shown in FIG. 1 according to a conventional system and conventional protocols and solution approaches, merely a looping back of the MPLS measuring packets to be transferred would have been conceivable at a forwarding plane using additional protocols or functions of the relevant edge routers, which could only be achieved with an increased outlay and additional protocols. Such multiple protocols and additional functions or modified software of the edge routers and the outlay connected therewith are avoided by embodiments of the present invention.

According to embodiments of the invention, MPLS measuring packets are transported via a measuring loop consisting of a chain of two or more edge routers, the measuring packets being able to contain any desired payload such as, for example, a sequence number, a time stamp or other desired data. The address or label information, for which the "measuring loop" is established as the chain of the edge routers to be run through, is obtained by the measuring packets from a measuring packet control system introduced with embodiments of the present invention. In order to be able to set up these label stacks of the measuring packets, the MPLS packet control system has to know the label switching tables (also known as label cross connect tables) and the tables with the same forwarding classes (FEC table) of the edge routers located in a measuring loop.

Embodiments of the present invention utilise conventional label connection tables of all the connecting nodes or routers involved, said nodes or routers not having to be influenced or changed by the handling according to embodiments of the invention. However, embodiments of the present invention utilise the contribution or complete contents of the label connection tables, which represent the basis of the mode of functioning according to an embodiment of the invention.

The label connection tables for the edge routers shown in FIGS. 1 and 3 are in each case given below. In this case, the first table column in each case designates the labels with address data of the label stack or address stack of a data packet arriving at the relevant connecting node or router. The second column contains the action of the relevant connecting node or router and the third column designates the label sent instead of the arriving label by the relevant connecting node or router. The destination address or sending interface, to which the data packet sent by the relevant connecting node or router is then sent, is given in each case in the last column:

Label connection table on the edge router W:

| Arriving label | Action | Sent label | Sending interface |
| --- | --- | --- | --- |
| Z | Supplement label | Nx | To IR1 |
| Mx | Exchange label | Nx | To IR1 |
| S | Discard label | — | To system S |

Label connection table on the inner router IR1:

| Arriving label | Action | Sent label | Sending interface |
| --- | --- | --- | --- |
| Nx | Exchange label | Ox | To IR2 |
| Dw | Discard label | — | To W |

Label connection table on the inner router IR2:

| Arriving label | Action | Sent label | Sending interface |
| --- | --- | --- | --- |
| Ox | Discard label | — | To X |
| Dw | Exchange label | Ew | To IR1 |

Label connection table on the edge router X:

| Arriving label | Action | Sent label | Sending interface |
| --- | --- | --- | --- |
| Z | Discard label | — | To system Z |
| Cw | Exchange label | Dw | To IR2 |

As can be inferred from the label connection tables shown above, the edge routers and the inner routers are in a position to either discard, exchange or supplement labels with address data from the label stack or address stack of an arriving data packet. In this manner, the connecting node or router can modify one or more labels of the label stack of an arriving data packet such that the label stack of the data packet forwarded by the connecting node or router comprises at least one modified or new label, which contains the address information of the adjacent sending interface.

According to an embodiment of the present invention, the label Mx at the edge router W and the label Cw at the edge router X, for example, are used as in inner routers, for which already existing functions of the edge routers can be used. After the discarding of a label (for example Ox), for example, only one label exchange may take place as the next one, because then the upper label is Cw. This may take place with the standard functions of the edge routers.

With a conventional system, in contrast to this, a further discarding or supplementation of labels in the label stack is always provided.

FIG. 2 shows the read-in process according to an embodiment of the invention of the MPLS measuring packet control system, which is produced from the determinations described above of the MPLS measuring packet control system of address information from an MPLS measuring packet. The read-in process is used with the aid of an MPLS measuring packet to prepare MPLS data packet transport in a connectionlessly routed MPLS data network according to an embodiment of the present invention, which will be described with the aid of the schematic representation of FIG. 3.

After the read-in process shown in FIG. 2, according to an embodiment of the present invention, a measuring packet to be sent is firstly addressed by an MPLS measuring packet control system. For this purpose, the MPLS measuring packet control system in the address or label stack of a measuring packet (packet 1), as the outermost label or outermost address, generates the transport label Mx, followed by a transport label My and furthermore followed by the IPv4 address or the label Z, which may be an IP address. If Z is a label, further address information can also be added to the label stack of the measuring packet 1. The label stack thus being produced is shown in FIG. 3.

The sending system A, as shown in FIG. 3, now sends the correspondingly addressed packet 1 to the edge router W. The edge router W adds the address information of the following edge router X to the label stack of the measuring packet 1, in that it exchanges the received transport label Mx for the transport label Nx. Then the edge router W forwards the packet 1 to a first inner MPLS router, which lies on the transmission path of the MPLS packet 1 before the edge router X.

There is now the possibility of the first inner MPLS router before the edge router X removing the upper MPLS label or the upper MPLS address from the address or label stack of the measuring packet 1. Alternatively, the edge router X may itself remove the upper MPLS label from the label stack of the data packet 1. Embodiments of the present invention may be applied to both alternatives, namely that the inner MPLS router removes the upper MPLS label before the edge router X or the edge router X itself removes the upper MPLS label.

In this case, the value of the relevant label for the application and implementation of the invention is without particular significance as, regardless of the value of the relevant label, the measuring packet 1 appears in the switching matrix of the edge router X in both cases with the upper transport label My, which is replaced with the transport label Ny by the edge router X.

Further explanations of embodiments of the invention are based on the manner of proceeding, in that the inner MPLS router removes the upper MPLS label from the measuring packet 1 before the edge router X, which will be called the "removing of the label at the penultimate portion" below and is taken as the basis for the following statements on the present invention.

In the further course of the transmission path shown in FIG. 2 and FIG. 3 from the edge router W to the edge router X to the edge router Z, the first inner MPLS router sends the measuring packet 1 to the edge router X with the MPLS cross connect table X, which adds the address information of the following edge router Y to the address or label stack of the measuring packet 1, in that it exchanges the received transport label My from the label stack of the measuring packet 1 for the transport label Ny. The edge router X then forwards the measuring packet 1 to a second inner MPLS router, which lies on the transmission path of the MPLS packet 1 before the edge router Y.

This second inner MPLS router forwards the MPLS packet 1 to the edge router Y with the MPLS cross connect table Y, which is connected to the received destination system Z. The edge router Y infers from the label stack of the measuring packet 1 the address information of the destination system from the label IP address Z and then transmits it to the interface of the destination system Z. Thus, the transmission path of the measuring packet 1 from the sending system A to the receiving destination system Z is complete.

The sequence of an MPLS data packet transport according to the present invention is shown schematically in FIG. 3. When the measuring packet 1 is to be sent back or looped back to the originally sending system A, the edge router Y has to be identical with the edge router W and the destination address Z has to correspond with the address of the system A. A recursive line path or a loop is thus produced, on which a measuring packet 1 is sent by the system A, forwarded from the edge router W to the edge router X and is looped by the edge router X back to the edge router W and the system A connected thereto. A loop of this type is shown in FIG. 4 and explained below.

Embodiments of the present invention allow and make it possible to construct such recursive transmission loops by means of any desired number of MPLS edge routers and to any desired destinations.

Figure 4:
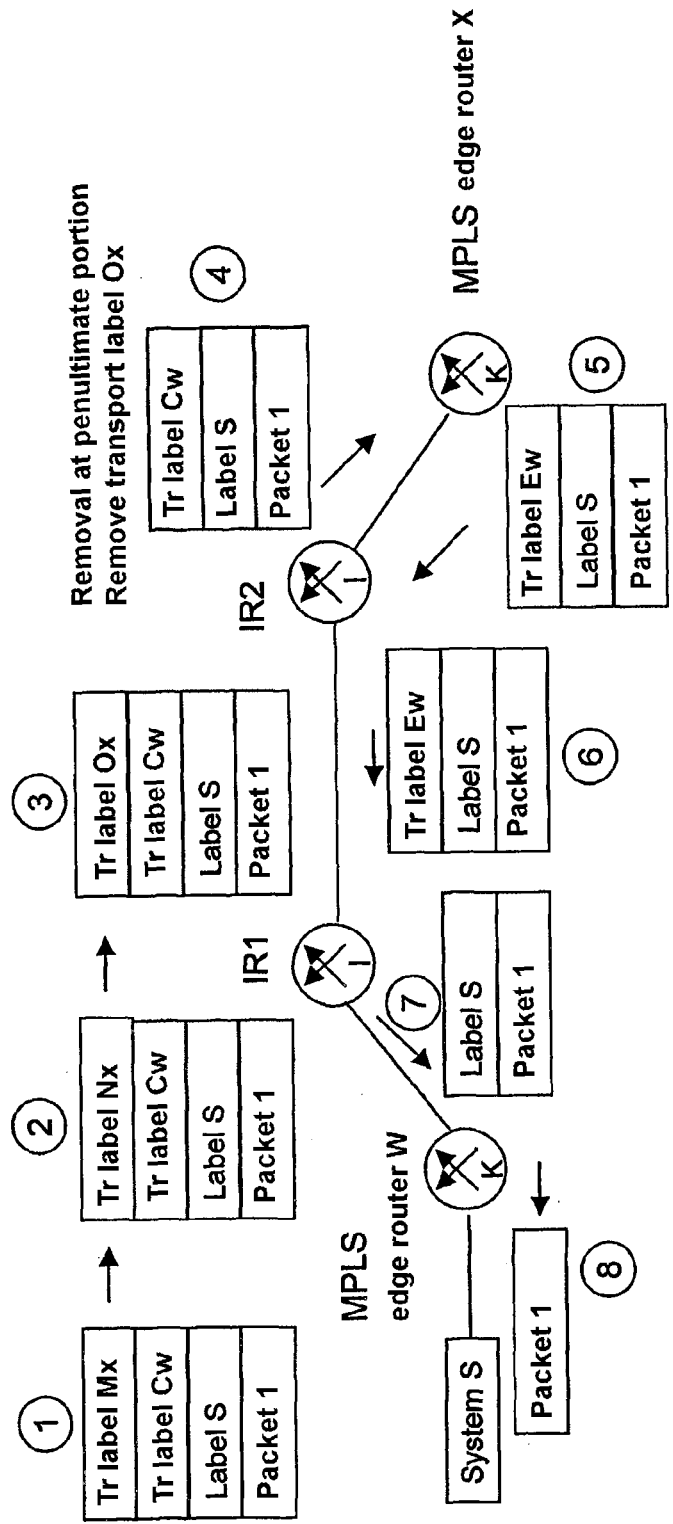
FIG. 4 shows a schematic representation of a looped MPLS data packet transport in a connectionlessly routed MPLS data network according to an embodiment of the present invention.

FIG. 4 schematically shows the sequence of a looped MPLS data packet transport according to an embodiment of the present invention. The MPLS data network shown in FIG. 4 comprises a sending system S, which is simultaneously the destination system, because a data measuring packet (packet 1) is looped by system S back on a loop through the network back to the system S. In this case, the data packet 1 is forwarded by a first MPLS edge router W to a first inner MPLS router IR1 onward to a second inner MPLS router IR2 up to a second edge router X and looped back again to the system S on the same reversed path. The transport path of the data packet therefore runs via the connecting nodes in a loop S-W-X-W-S.

The individual stations on the path of the looped MPLS data packet transport are characterised in FIG. 4 in accordance with the order, by encircled numbers from 1 to 8. At the first station 1, a label stack is firstly produced for the data packet and comprises destination address information (label S) in the form of an MPLS label, an IPv4-address or Ethernet address and a transport label Mx and a transport label Cw.

At the second station 2, the MPLS edge router W modifies the label stack of the data packet 1, in that it exchanges the transport label Mx for a new or modified transport label Nx and forwards the data packet 1 to the first inner MPLS router IR1. In this case, the label N and the index x in each case represent a numerical value identifying the destination edge router X.

At the third station 3, the first inner MPLS router IR1 modifies the label stack of the data packet, in that it exchanges the transport label Nx for a new or modified transport label Ox and forwards the data packet to the second inner MPLS router IR2 at the penultimate portion of the MPLS transmission path.

The fourth station 4 characterises the penultimate portion of the MPLS transmission path, at which the second inner MPLS router IR2 modifies the label stack of the data packet, in that it removes the transport label Ox and thus exposes the transport label Cw located therebelow. The second inner MPLS router IR2 then forwards the data packet to the second MPLS edge router X.

At the fifth station 5 of the MPLS transmission path, the second MPLS edge router X modifies the label stack of the data packet, in that it exchanges the transport label Cw for a new or modified transport label Dw and sends the data packet 1 back to the second inner MPLS router IR2. The address information of the new destination edge router W in the label stack is identified by the new transport label Dw.

At the sixth station 6 of the data packet transport path, the second inner MPLS router IR2 modifies the label stack of the data packet in that it exchanges the transport label Dw for a new or modified transport label Ew and forwards the data packet to the first inner MPLS router IR1. At the seventh station 7 of the data packet transport path, the first inner MPLS router IR1 removes the transport label Dw from the label stack and therefore exposes the label S located therebelow, which contains the address information of the start or destination system S.

At the eighth and last station 8 of the data packet transport path, the first MPLS edge router W now removes the last label S from the label stack and forwards the data packet to the start/destination system S.

Embodiments of the present invention in particular configure the penultimate portion of the MPLS transmission path in a novel manner, which was explained above with reference to the fifth station 5 of the data packet transport path. According to this, the label, which is exposed by the inner MPLS router at the penultimate portion of the MPLS transmission path in the label stack of the data packet after the removal of Ox, is the transport label Cw, which is exchanged by the edge router X. This transport label Cw is not entered in the edge router X as a label, the packets of which are guided to a local customer interface. For this purpose, the label stack of a data packet is assembled in a novel manner, as described here.

To carry out embodiments of the present invention, no new technical features or functions of edge routers are therefore required, but conventional edge routers with known functions can be used. Embodiments of the present invention therefore make use of existing technology and uses already existing technical features in a novel and advantageous manner.

However, using conventional protocols and solution approaches, it was not possible to realise a loop or a recursive line path for the MPLS measuring packets to be transferred, in which, as shown in FIG. 3, an MPLS measuring packet is firstly guided or looped from the edge router W to the edge router X and then back to the edge router W, the edge router X remaining in terms of protocol completely in the MPLS forwarding level.

Embodiments of the present invention therefore allow the formation of recursive line paths or loops of MPLS measuring packets purely on the MPLS forwarding level, going beyond conventional approahces. Using a conventional system, only the function VCCV of an MPLS edge router can loop a measuring packet on the VC level back to an edge router. For this purpose, however, in addition to the paths of the forwarding level, a pseudo wire to be additionally constructed is required for each loop to be utilised. In contrast to this, embodiments of the invention exclusively utilise already existing paths of the forwarding level. MPLS echo request and echo reply also utilise a method other than the invention, since they leave the MPLS forwarding plane in the looping edge router, are processed by the edge router and are only then sent again.

Using conventional protocols and solution approaches, transfer paths of MPLS packets or loops can generally be realised by any desired edge routers only with a considerable outlay, as additional tunnels, external apparatuses, sequential measurements or the like are necessary for this. Using conventional means, a looping of a plurality of MPLS edge routers, for example, would be conceivable on a purely MPLS forwarding level with additional protocols or functions of the edge routers.

Embodiments of the present invention avoid the technical and protocol outlay connected to conventional systems by a data forwarding, in which an MPLS edge router forwards a packet received with an MPLS label and in the process exchanges a label of the packet for another label, whereby information, in particular address information contained in the label, is exchanged. For the application of embodiments of the invention it is not significant here how this exchange of information is set up in the edge router.

According to an embodiment of the present invention, a measuring packet control system is established, which establishes the MPLS label stack and the destination addressing of measuring packets. For this purpose, the measuring packet control system receives the necessary MPLS label information and destination address information in advance, which can take place in any suitable manner and can easily be implemented using existing technology. Advantages of the present invention therefore emerge from the combination with functions of existing technology and the novel solution being produced therefrom.

Using embodiments of the present invention, each edge router exchanges, on the transmission path of the MPLS packet, at least one part of the label stack, in particular a label from the label stack of the MPLS packet, wherein, in the label put in in exchange, which label the edge router puts in place of the exchanged label in the label stack of the MPLS packet, at least the address information of the edge router following on the guide path of the data packet is contained. As a result, each edge router on the transmission path of the MPLS packet from a sender to the addressee stores its address data and/or the addressees of the edge router following on the line path of the data packet in the label stack of the MPLS packet.

According to embodiments of the present invention, address information for any desired number of edge routers can be stored in the address stack or label stack of an MPLS packet, in the form of a chain of any length of MPLS edge routers W, X, Y etc., which the MPLS packet passes on its transmission path from the sender to the destination. This addressing of the label stack of an MPLS packet takes place according to the invention from the top from the uppermost label or from the uppermost address down to the lowermost label or to the lowermost address of the MPLS edge routers in the order of the MPLS edge routers to be run through on its transmission path from the sender to the destination. In contrast to conventional systems, this label stack can therefore consist of a plurality of MPLS labels, which identify the MPLS edge routers to be passed.

In this manner, all the information on the transmission path, on which the MPLS packet was transferred, including the address data of each edge router, which the MPLS packet has passed on the transmission path from the sender to the addressee, is contained in the address or label stack of the MPLS packet. Using this information, the MPLS packet can also be looped back again on the same transmission path to the addressee, without further protocols or additional functions of the switching nodes or edge routers being necessary. Embodiments of the present invention therefore combine existing technology and known functions with a novel manner of proceeding and handling MPLS packets in connectionless networks during their looping between the sender and destination address.

An MPLS packet control system according to embodiments of the invention can furthermore be in a position to set up recursive transmission paths or loops for MPLS packets or a number of MPLS switching nodes, without an apparatus sending the MPLS packets or an apparatus receiving the MPLS packets having to take part in the routing of the MPLS switching nodes. Rather, a rigidly set switching of MPLS packets in each case from the switching node to the sending or receiving apparatus connected thereto is sufficient for this.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The invention claimed is:

1. A method for transferring Multiprotocol Label Switching (MPLS) packets in a connectionless network, the MPLS packets passing a number of inner MPLS switching nodes on a transmission path between a sender and a destination as well as at least two MPLS edge routers, each MPLS edge router being a transition between a core network of the connectionless network and a connection network of the connectionless network, the method comprising:
producing an address stack or label stack for an MPLS packet to be sent in the connectionless network, wherein the address stack or label stack is added to the MPLS packet to be sent and comprises address information on the inner switching nodes to be passed on the transmission path of the MPLS packet in the connectionless network and address information for the at least two MPLS edge routers to be passed on the transmission path of the MPLS packet in the connectionless network; and
looping the MPLS packet on the transmission path between the sender and the destination from an MPLS edge router corresponding to the sender to an MPLS edge router corresponding to the destination and back to the MPLS edge router corresponding to the sender, wherein the looping comprises:
at a penultimate portion of the transmission path to the destination or at the MPLS edge router corresponding to the destination, removing a first or upper transport label of the address stack or label stack to expose a second or lower transport label of the address stack or label stack; and
modifying, by the MPLS edge router corresponding to the destination, the exposed second or lower transport label to direct the MPLS packet towards the MPLS edge router corresponding to the sender;
wherein by a first MPLS edge router on the transmission path of the MPLS packet in the label stack of the MPLS packet, a first transport label, which contains the address information of the first MPLS edge router and was sent to the first MPLS edge router by a system, is replaced by a second transport label with the address information of a second MPLS edge router, which follows the first MPLS edge router on the transmission path according to the addressing of the MPLS packet, and the first MPLS edge router then sends the MPLS packet to the second MPLS edge router;
wherein the address information for a number of MPLS edge routers from an uppermost label with the address information of a first MPLS edge router to be passed to a lowermost label with the address information of a last MPLS edge router to be passed is stored in a sequence of the MPLS edge routers to be run through on the transmission path of the MPLS packet from the sender to the destination; and
wherein at a last inner switching node on the transmission path before an MPLS edge router, a label is removed from the label stack of the MPLS packet and a label from the label stack of the MPLS packet is exchanged in the MPLS edge router directly following on the transmission path and the MPLS packet continues to remain in the core network.

2. The method of claim 1, wherein the at least two MPLS edge routers, when the MPLS packet passes, perform at least one of:
removing at least a part of the address stack or label stack of the MPLS packet;
exchanging at least a part of the address stack or label stack of the MPLS packet; and
modifying at least a part of the address stack or label stack of the MPLS packet.

3. The method of claim 2, wherein each MPLS edge router that the MPLS packet passes on the transmission path of the MPLS packet through the connectionless network replaces at least one label from the label stack of the MPLS packet with another label, wherein the another label comprises at least one of: address information of the switching node following on the line path of the data packet or of all the switching nodes following on a line path of the data packet.

4. The method of claim 1, wherein each MPLS edge router that the MPLS packet passes on the transmission path of the MPLS packet through the connectionless network performs at least one of:

modifying a different label from the original label stack of the MPLS packet; and exchanging a different label for another label, which comprises at least one of: information on the relevant MPLS edge router or information on the switching nodes following on a line path of the data packet.

5. The method of claim 1, wherein each MPLS edge router forwards a data packet with an address stack to an address which is contained in an uppermost label of the label stack also and when the address leads to a forwarding to a switching node within the core network.

6. The method of claim 1, wherein the MPLS packet can be guided back with aid of the address information stored in the label stack from an original destination to the original sender through the connectionless network on loops via the at least two MPLS edge routers established by the address information in the label stack.

7. The method of claim 1, wherein the MPLS packet is configured to be guided through the connectionless network by the address information related to the at least two MPLS edge routers in the label stack by relevant MPLS edge routers in a sequence established by the address information in the label stack of the MPLS edge routers to be run through.

8. The method of claim 1, wherein at least one MPLS packet with label stacks and destination address information is produced with aid of MPLS label switching and address information on a same forwarding equivalence class of each MPLS edge router to be run through on the transmission path of the MPLS packet.

9. The method of claim 1, wherein at least the first MPLS edge router on the transmission path of the MPLS packet is utilized by using a core router function of the MPLS edge router like an inner switching node.

10. The method of claim 1, wherein the packet with the first transport label is sent to the first MPLS edge router on the transmission path of the MPLS packet by the system which is part of an IP or MPLS core network.

11. The method of claim 1, wherein the packet with the first transport label is sent to the first MPLS edge router on the transmission path of the MPLS packet by the system which is outside part of an IP or MPLS core network.

12. The method of claim 1, wherein the number of all of the at least two MPLS edge routers except for a destination MPLS edge router on the transmission path of the MPLS packet is utilized by using a core router function of the MPLS edge routers like inner switching nodes.

13. The method of claim 1, wherein address information on a destination address is furthermore contained in the address stack or label stack of the MPLS packet in addition to the address information of the MPLS switching nodes and MPLS edge routers to be run through on the transmission path of the MPLS packet from the sender to the destination.

14. The method of claim 1, wherein a last MPLS edge router on the transmission path of the MPLS packet guides the MPLS packet to the destination of the MPLS packet with aid of the destination address in the address stack or label stack of an MPLS packet.

15. The method of claim 1, wherein the destination of the MPLS packet is a logical or physical interface of an MPLS edge router, an IPv4 address that can be reached by a logical or physical interface of the MPLS edge router, or an internal termination of the MPLS edge router.

16. The method of claim 1, wherein, in an MPLS edge router, a label is first removed from the label stack of the MPLS packet and a label from the label stack of the MPLS packet is then exchanged, without further changes to the label stack having to take place to forward the MPLS packet.

17. A Multiprotocol Label Switching (MPLS) packet control system to transfer MPLS packets in a connectionless network, the MPLS packets passing in the connectionless network a number of inner MPLS switching nodes on a transmission path between a sender and a destination as well as at least two MPLS edge routers, each MPLS edge router being a transition between a core network of the connectionless network and a connection network of the connectionless network, wherein the MPLS packet control system comprises a non-transitory computer-readable medium having processor-executable instructions stored thereon and a processor, configured to execute the processor-executable instructions to facilitate:

producing an address stack or label stack for an MPLS packet to be sent, and to add the address stack or label stack to the MPLS packet to be sent, the address stack or label stack comprising address information on the at least two MPLS edge routers to be passed on the transmission path of the MPLS packet; and looping the MPLS packet on the transmission path between the sender and the destination from an MPLS edge router corresponding to the sender to an MPLS edge router corresponding to the destination and back to the MPLS edge router corresponding to the sender, wherein the looping comprises:

at a penultimate portion of the transmission path to the destination or at the MPLS edge route corresponding to the destination, removing a first or upper transport label of the address stack or label stack to expose a second or lower transport label of the address stack or label stack; and modifying, by the MPLS edge router corresponding to the destination, the exposed second or lower transport label to direct the MPLS packet towards the MPLS edge router corresponding to the sender;

wherein by a first MPLS edge router on the transmission path of the MPLS packet in the label stack of the MPLS packet, a first transport label, which contains the address information of the first MPLS edge router and was sent to the first MPLS edge router by a system, is replaced by a second transport label with the address information of a second MPLS edge router, which follows the first MPLS edge router on the transmission path according to the addressing of the MPLS packet, and the first MPLS edge router then sends the MPLS packet to the second MPLS edge router;

wherein the address information for a number of MPLS edge routers from an uppermost label with the address information of a first MPLS edge router to be passed to a lowermost label with the address information of a last MPLS edge router to be passed is stored in a sequence of the MPLS edge routers to be run through on the transmission path of the MPLS packet from the sender to the destination; and wherein at a last inner switching node on the transmission path before an MPLS edge router, a label is removed from the label stack of the MPLS packet and a label from the label stack of the MPLS packet is exchanged in the MPLS edge router directly following on the transmission path and the MPLS packet continues to remain in the core network.

18. The MPLS packet control system according to claim 17, wherein the MPLS edge routers are configured to forward information to the MPLS packet control system giving a label value for a reachable destination edge router, and wherein the MPLS edge routers are configured to forward a received packet, which comprises the label value, to a corresponding destination edge router.

19. The MPLS packet control system according to claim 18, wherein the MPLS packet control system is connected to an MPLS edge router, which is set up to receive MPLS packets on the interface of the MPLS packet control system and to forward the MPLS packets in accordance with the addressing of the MPLS packets.

20. The MPLS packet control system according to claim 17, wherein the MPLS packet control system is set up in order to use MPLS paths or loops in the network for MPLS packets by a number of MPLS edge routers, without a sending device sending the MPLS packets or a receiving device receiving the MPLS packets taking part in the routing of all the MPLS switching nodes, with the exception of the MPLS edge routers to which the sending or receiving devices are connected.

21. The MPLS packet control system according to claim 17, wherein the address information is produced in the label stack of MPLS packets to be sent by MPLS functions and address functions of the MPLS packet control system.

22. The MPLS packet control system according to claim 17, wherein the MPLS packet control system is realized as a separate device or as an internal function of an MPLS edge router.

23. The MPLS packet control system according to claim 17, wherein a number of measuring mechanisms is provided, which carry out a check of the continuity of MPLS paths in the network.

24. The MPLS packet control system according to claim 17, wherein the complete MPLS network and the transmission paths of the MPLS packets are monitored using only one measuring mechanism.

* * * * *